(12) United States Patent
Matsui (10) Patent No.: US 11,526,264 B2
(45) Date of Patent: Dec. 13, 2022

(54) ELECTRONIC APPARATUS FOR ENLARGING OR REDUCING DISPLAY OBJECT, METHOD OF CONTROLLING ELECTRONIC APPARATUS, AND NON-TRANSITORY COMPUTER READABLE MEDIUM

(71) Applicant: CANON KABUSHIKI KAISHA, Tokyo (JP)

(72) Inventor: Takashi Matsui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 16/892,219

(22) Filed: Jun. 3, 2020

(65) Prior Publication Data
US 2020/0387294 A1 Dec. 10, 2020

(30) Foreign Application Priority Data

Jun. 4, 2019 (JP) .............................. JP2019-104496

(51) Int. Cl.
*G06F 3/04845* (2022.01)
*G06F 3/01* (2006.01)
(Continued)

(52) U.S. Cl.
CPC .......... *G06F 3/04845* (2013.01); *G06F 3/013* (2013.01); *G06F 3/04817* (2013.01); *G06F 3/04847* (2013.01); *G06F 3/04883* (2013.01)

(58) Field of Classification Search
CPC .. G06F 3/04845; G06F 3/013; G06F 3/04817; G06F 3/04883; G06F 3/04847;
(Continued)

(56) References Cited

U.S. PATENT DOCUMENTS 10,558,272 B2 * 2/2020 Parshionikar ......... G06F 3/0346
2005/0237412 A1 * 10/2005 Shiohara .............. H04N 5/2251
348/333.11
(Continued)

FOREIGN PATENT DOCUMENTS

| CN | 102068237 A | 5/2011 |
|----|-------------|--------|
| CN | 102566756 A | 7/2012 |

(Continued)

OTHER PUBLICATIONS

The above documents were cited in a Apr. 13, 2022 Chinese Office Action, which is enclosed with an English Translation, that issued in Chinese Patent Application No. 202010497375.9.

*Primary Examiner* — Jennifer N Welch
*Assistant Examiner* — Ashley M Fortino
(74) *Attorney, Agent, or Firm* — Cowan, Liebowitz & Latman, P.C.

(57) ABSTRACT

An electronic apparatus comprising: a specific operation member; a line-of-sight detection unit configured to detect a viewed position of a user with respect to a display; and a control unit configured to control so that, in the case where a specific operation member is operated after a predetermined condition representing a fact that a display object displayed on the display is gazed at is satisfied, the display object is enlarged or reduced with a position, based on a gazing position detected by the line-of-sight detection unit, as the center, in accordance with an operation amount or a number of times of operation performed on the specific operation member, at a display magnification out of at least three stages of display magnifications.

15 Claims, 5 Drawing Sheets

(51) Int. Cl.
*G06F 3/04817* (2022.01)
*G06F 3/04883* (2022.01)
*G06F 3/04847* (2022.01)

(58) Field of Classification Search
CPC ........ G06F 3/0488; G06F 2203/04806; H04N 5/2251; H04N 5/22525; H04N 5/23216; H04N 5/232935
See application file for complete search history.

(56) References Cited

U.S. PATENT DOCUMENTS

| | | | | |
|---|---|---|---|---|
| 2009/0153721 | A1* | 6/2009 | Fujio | H04N 5/23293 348/333.12 |
| 2015/0332091 | A1* | 11/2015 | Kim | G06T 7/337 382/103 |
| 2018/0307303 | A1* | 10/2018 | Powderly | G02B 27/017 |
| 2018/0364810 | A1 | 12/2018 | Parshionikar | |

FOREIGN PATENT DOCUMENTS

| | | | |
|---|---|---|---|
| CN | 106796344 A | | 5/2017 |
| JP | 07-283991 A | | 10/1995 |
| JP | 2014142882 A | * | 8/2014 |

\* cited by examiner

ISO400

ELECTRONIC APPARATUS FOR ENLARGING OR REDUCING DISPLAY OBJECT, METHOD OF CONTROLLING ELECTRONIC APPARATUS, AND NON-TRANSITORY COMPUTER READABLE MEDIUM

BACKGROUND OF THE INVENTION

Field of the Invention

The present invention relates to an electronic apparatus that enlarges or reduces a display object, a method of controlling the electronic apparatus, and a non-transitory computer readable medium.

Description of the Related Art

Electronic apparatuses that can control an image displayed on a display, in accordance with the line of sight of the user to the image, have been used.

Japanese Patent Application Publication No. H7-283991 discloses a technique that determines whether the position inputted by line of sight input is within a selectable region, and if it is, enlarges the image with the inputted position as the center.

However, according to the technique disclosed in Japanese Patent Application Publication No. H7-283991, the display object image is enlarged only at a predetermined magnification, and cannot be enlarged/reduced at a magnification desired by the user.

SUMMARY OF THE INVENTION

With the foregoing in view, it is an object of the present invention to provide an electronic apparatus that enlarges or reduces a display object at a position corresponding to the line of sight of the user, and is capable of enlargement or reduction of the display object at a magnification desired by the user.

An aspect of the invention is:

an electronic apparatus comprising:

at least one memory and at least one processor which function as:

a specific operation member;

a line-of-sight detection unit configured to detect a viewed position of a user with respect to a display; and a control unit configured to control so that, in the case where the specific operation member is operated after a predetermined condition representing a fact that a display object displayed on the display is gazed at is satisfied, the display object is enlarged or reduced with a position, based on a gazing position detected by the line-of-sight detection unit, as the center, in accordance with an operation amount or a number of times of operation performed on the specific operation member, at a display magnification out of at least three stages of display magnifications.

Further features of the present invention will become apparent from the following description of exemplary embodiments with reference to the attached drawings.

DESCRIPTION OF THE EMBODIMENTS

Embodiment 1

External View of Digital Camera 100

Figure 1A:
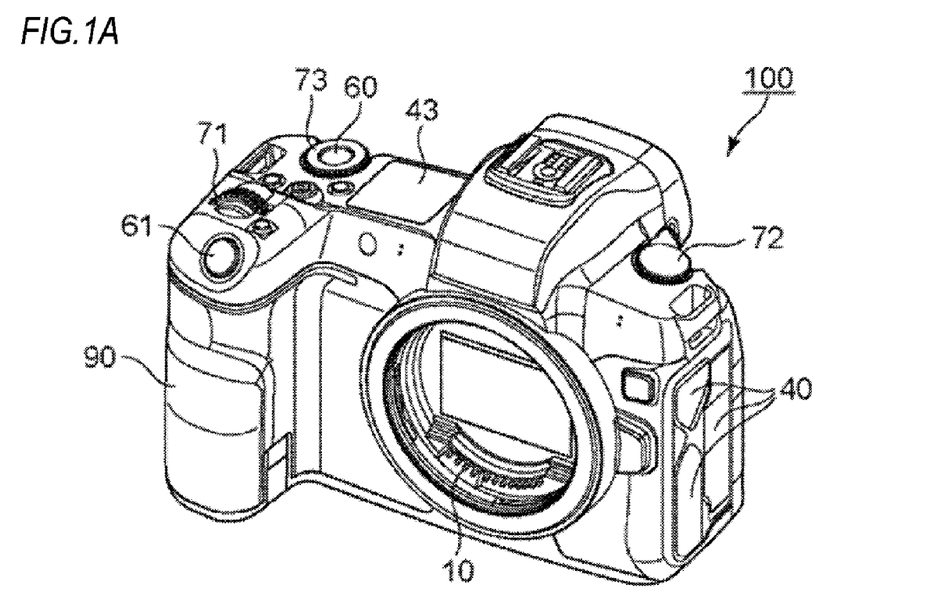
FIG. 1A and FIG. 1B are external views of a digital camera according to an embodiment.
Figure 1B:
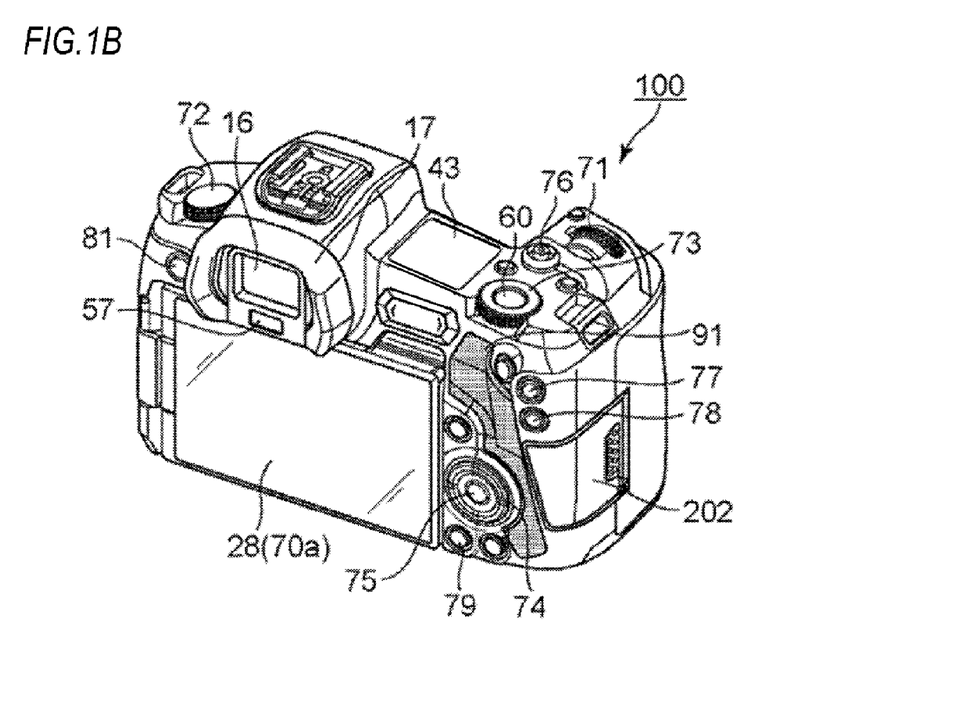

Preferred embodiments of the present invention will be described with reference to the drawings. FIG. 1A and FIG. 1B are external views of a digital camera 100, that is, an example of an apparatus to which the present invention is applicable. FIG. 1A is a front perspective view of the digital camera 100, and FIG. 1B is a rear perspective view of the digital camera 100.

A display unit 28 is a display disposed on the rear surface of the digital camera 100, and displays images and various information. A touch panel 70a detects touch operation performed on a display surface (touch operation surface) of the display unit 28. A finder outside display unit 43 is a display disposed on the upper surface of the digital camera 100, and displays various set values of the digital camera 100, such as the shutter speed and aperture. A shutter button 61 is an operation member to instruct to capture an image. A mode selection switch 60 is an operation member to switch various modes. Terminal covers 40 are covers to protect connectors (not illustrated) to connect the digital camera 100 to external apparatuses.

A main electronic dial 71 is a rotational operation member, and such a set value as the shutter speed and aperture can be changed by turning the main electronic dial 71. A power switch 72 is an operation member to switch the ON/OFF of the power supply of the digital camera 100. A sub-electronic dial 73 is a rotational operation member, and movement of a selection frame (cursor) and image forwarding, for example, can be performed by turning the sub-electronic dial 73. A four-direction key 74 is configured such that the upper part, lower part, left part and right part of the key can be pressed respectively, so that processing corresponding to the pressed part of the four-direction key 74 can be performed. A SET button 75 is a press button (push button), and is mainly used to determine a selected item.

A video button 76 is used to instruct start or stop video shooting (recording). An AE lock button 77 is a press button, and the exposure state can be fixed by pressing the AE lock button 77 in the image capturing standby state. An enlargement button 78 is an operation button to switch an enlargement mode ON/OFF in a live view display (LV display) of the image capturing mode. If the main electronic dial 71 is operated after setting the enlargement mode to ON, the live view image (LV image, live image) can be enlarged or reduced. In a reproduction mode, the enlargement button 78 functions as an operation button to enlarge the reproduced image or to increase the enlargement ratio. A reproduction button 79 is an operation button to switch the image capturing mode and the reproduction mode. If the reproduction button 79 is pressed in the image capturing mode, the mode changes to the reproduction mode, in which the latest image, out of the images recorded in a recording medium 200 (described later), can be displayed on the display unit 28. A menu button 81 is a press button that is used to instruct to display a menu screen, and if the menu button 81 is pressed, the menu screen, that allows various settings, is displayed on the display unit 28. The user can intuitively perform various settings using the menu screen displayed on the display unit 28, the four-direction key 74 and the SET button 75.

A communication terminal 10 is a communication terminal for the digital camera 100 to communicate with a lens unit 150 (detachable, described later). An eye piece 16 is an eyepiece portion of an eye piece finder (peep type finder), and the user can view an image displayed on an internal EVF 29 (described later) via the eye piece 16. An eyepiece detection unit 57 is an eye contact (eye proximity) detection sensor to detect whether an eye of the user (image capturing person) is contacting the eye piece 16. A cover 202 is a cover of a slot to store a recording medium 200 (described later). A grip 90 is a holding unit having such a shape that the user can hold the digital camera 100 with their right hand when capturing images. When the user holds the digital camera 100 by gripping the grip 90 with their little finger, ring finger and middle finger, while contact their eye with the eye piece 16, the shutter button 61 and the main electronic dial 71 are in positions that can be operated by the index finger of the right hand. In this state, the sub-electronic dial 73 is in a position that can be operated by the thumb of the right hand. A thumb rest 91 (thumb standby position) is a grip member provided on the back surface side of the digital camera 100 that is disposed in a place where the thumb of the right hand which is holding the grip 90 can easily rest when no operation member is operated. The thumb rest 91 is constituted of a rubber member or the like to enhance the holding force (sense of gripping).

Configuration Block Diagram of Digital Camera 100

Figure 2:
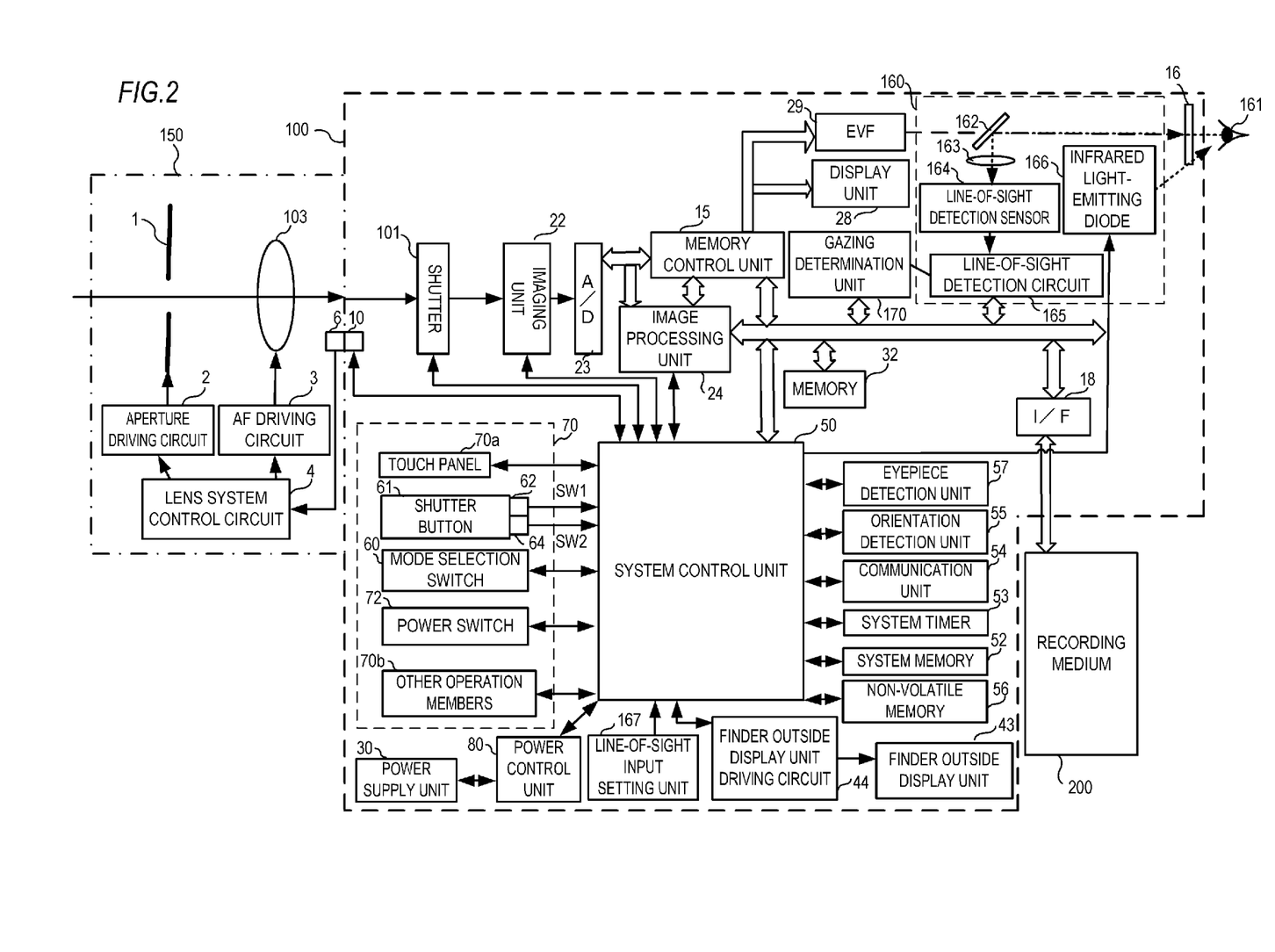
FIG. 2 is a block diagram of the digital camera according to the embodiment.

FIG. 2 is a block diagram depicting a configuration example of the digital camera 100. A lens unit 150 is a lens unit equipped with a replaceable image capturing lens. A lens 103 is normally constituted by a plurality of lenses, but is illustrated as one lens in FIG. 2 for simplification. A communication terminal 6 is a communication terminal for the lens unit 150 to communicate with the digital camera 100, and a communication terminal 10 is a communication terminal for the digital camera 100 to communication with the lens unit 150. The lens unit 150 communicates with a system control unit 50 via these communication terminals 6 and 10. Then the lens unit 150 controls an aperture 1 via an aperture driving circuit 2, using an internal lens system control circuit 4. The lens unit 150 also performs focusing by moving the lens 103 via an AF driving circuit 3 using a lens system control circuit 4.

A shutter 101 is a focal plane shutter that can freely control the exposure time of an imaging unit 22 based on the control by the system control unit 50.

The imaging unit 22 is an image pickup element constituted of a CCD, a CMOS element or the like, to convert an optical image into electric signals. The imaging unit 22 may include an imaging plane phase difference sensor which outputs defocus amount information to the system control unit 50.

An image processing unit 24 performs a predetermined processing (e.g. pixel interpolation, resizing, such as reduction, color conversion processing) on the data from an A/D convertor 23 or on the data from a memory control unit 15. The image processing unit 24 also performs a predetermined arithmetic processing using the captured image data, and the system control unit 50 performs exposure control and distance measurement control based on the arithmetic result acquired by the image processing unit 24. Thereby through-the-lens (TTL) type autofocus (AF) processing, auto exposure (AE) processing, pre-flash emission (EF) processing and the like are performed. Furthermore, the image processing unit 24 performs a predetermined arithmetic processing using the captured image data and performs TTL type auto white balance (AWB) processing based on the acquired arithmetic result.

The memory control unit 15 controls the transmission and reception of data among the A/D convertor 23, the image processing unit 24 and a memory 32. The output data from the A/D convertor 23 is written to the memory 32 via the image processing unit 24 and the memory control unit 15. In some cases, the output data from the A/D convertor 23 is written to the memory 32 via the memory control unit 15 side stepping the image processing unit 24. The memory 32 stores image data which was acquired by the imaging unit 22 and converted into digital data by the A/D convertor 23, and image data to be displayed on a display unit 28 or an EVF 29. The memory 32 has a storage capacity that is sufficient to store a predetermined number of still images, and a predetermined duration of moving images and sounds.

The memory 32 is also a memory for image display (video memory). The image data to be displayed, that is written in the memory 32, is displayed on the display unit 28 or the EVF 29 via the memory control unit 15. The display unit 28 and the EVF 29 perform display in accordance to the signals from the memory control unit 15 respectively, on such a display as an LCD and organic EL. Live view (LV) display can be performed by sequentially transferring the data, which as AD-converted by the A/D convertor 23 and stored in the memory 32, to the display unit 28 or the EVF 29, and displaying the data. An image displayed by the live view display is referred to as a live view image (LV image).

A line-of-sight detection unit 160 (eye tracker, eye tracking unit) detects the line of sight of the user at the eye piece 16. The line-of-sight detection unit 160 is constituted of a dichroic mirror 162, an image forming lens 163, a line-of-sight detection sensor 164, a line-of-sight detection circuit 165, and an infrared light-emitting diode 166. The line-of-sight detection unit 160 may be regarded as the operation unit 70, since the system control unit 50 can execute a predetermined processing in accordance with the detection of the line of sight.

The infrared light-emitting diode 166 is a light-emitting element to detect a viewed position of the user in the finder screen, and irradiates infrared light to an eyeball (eye) 161 of the user. The infrared light emitted from the infrared light-emitting diode 166 is reflected by the eyeball (eye) 161, and the reflected infrared light reaches the dichroic mirror 162. The dichroic mirror 162 reflects only the infrared light, and allows the visible light to pass. The reflected infrared light, of which optical path is changed, forms an image on an imaging plane of the line-of-sight detection sensor 164 via the image forming lens 163. The image forming lens 163 is an optical member that constitutes the line-of-sight detection optical system. The line-of-sight detection sensor 164 is constituted of such an imaging device as a CCD type image sensor.

The line-of-sight detection sensor 164 photo-electrically converts the entered reflected infrared light into electric signals, and outputs the electric signals to the line-of-sight detection circuit 165. Based on the output signal from the line-of-sight detection sensor 164, the line-of-sight detection circuit 165 detects the viewed position of the user from the movement of the eyeball (eye) 161 of the user, and outputs the detection information to the system control unit 50 and a gazing determination unit 170.

A line-of-sight input setting unit 167 sets valid/invalid of the line of sight detection by the line-of-sight detection circuit 165 (line-of-sight detection unit 160). Alternatively, the line-of-sight input setting unit 167 sets valid/invalid of the processing performed by the system control unit 50 using the line of sight input. For example, the user can freely set this valid/invalid by the operation performed on the operation unit 70.

Based on the detection information received from the line-of-sight detection circuit 165, the gazing determination unit 170 determines that the user is gazing at a region when the line of sight of the user is fixed on the region for a period longer than a predetermined threshold. Therefore, this region is regarded as a gazed position (gazed region), which is a position at which the user is gazing. Here "line of sight . . . is fixed on a region" means that the average position of the moving line of sight is within this region at least for a predetermined period, and the variation (dispersion) of the viewed position is less than a predetermined value. The predetermined threshold can be freely changed by the system control unit 50. Instead of including the gazing determination unit 170 as an independent block, the system control unit 50 may execute the same function as the gazing determination unit 170, based on the detection information received from the line-of-sight detection circuit 165.

Various set values of the camera, such as shutter speed and aperture, are displayed on the finder outside display unit 43 via a finder outside display unit driving circuit 44.

A non-volatile memory 56 is a memory which is electrically erasable and recordable, such as a Flash-ROM. In the non-volatile memory 56, constants and programs for operating the system control unit 50, for example, are recorded. "Programs" here refers to the programs for executing various flow charts which will be described later in this embodiment.

The system control unit 50 is a control unit constituted of at least one processor or circuit, and controls the digital camera 100 in general. The system control unit 50 implements each processing of this embodiment (described later) by executing the programs recorded in the above mentioned non-volatile memory 56. A system memory 52 is a RAM, for example, and the system control unit 50 develops, in the system memory 52, the constants and variables for operating the system control unit 50, and the programs read from the non-volatile memory 56. The system control unit 50 also controls display by controlling the memory 32, the display unit 28 and the like.

A system timer 53 is a clock unit that measures the time used for various controls and the time of the internal clock.

A power control unit 80 is constituted of a battery detection unit, a DC-DC convertor, switch circuits to switch a block to be energized, and detects whether a battery is installed, the type of battery, and the residual amount of battery power, for example. The power control unit 80 also controls the DC-DC convertor based on the detection result and the instruction of the system control unit 50, and supplies the required voltage to each unit, including the recording medium 200, for a required period of time. A power supply unit 30 is constituted of a primary battery (e.g. alkali battery, lithium battery), a secondary battery (e.g. NiCd battery, NiMH battery, Li battery), an AC adapter and the like.

A recording medium I/F 18 is an interface with the recording medium 200 (e.g. memory card, hard disk). The recording medium 200 is a recording medium to record captured images, such as a memory card, and is constituted of a semiconductor memory, a magnetic disk or the like.

A communication unit 54 transmits/receives video signals and sound signals to/from an external apparatus connected wirelessly or via cable. The communication unit 54 can also be connected with a wireless local area network (LAN) and the Internet. The communication unit 54 can also communicate with an external apparatus via Bluetooth® or with Bluetooth® Low Energy devices. The communication unit 54 can transmit an image (including an LV image) captured by the imaging unit 22 and an image recorded in the recording medium 200, and can receive image data and various other information from an external apparatus.

An orientation detection unit 55 detects an orientation of the digital camera 100 with respect to the gravity direction. Based on the orientation detected by the orientation detection unit 55, it can be determined whether an image captured by the imaging unit 22 is an image captured by the digital camera 100 held horizontally, or an image captured by the digital camera 100 held vertically. The system control unit 50 can attach the orientation information in accordance with the orientation detected by the orientation detection unit 55 to an image file of an image captured by the imaging unit 22, or can rotate and record the image. For the orientation detection unit 55, an acceleration sensor, a gyro sensor or the like can be used. The motion of the digital camera 100 (e.g. pan, tilt, lift, remain still) can be detected using the acceleration sensor or gyro sensor of the orientation detection unit 55.

The eyepiece detection unit 57 detects the approach (contact) and the withdrawal (release) of an eye (object) 161 to/from the eye piece 16 of the eye piece finder 17 (hereafter "finder"). The system control unit 50 switches the state of the display unit 28 and the EVF 29 between display (display state)/non-display (non-display state) in accordance with the state detected by the eyepiece detection unit 57. In concrete terms, in the case where the state is the image capturing standby state, and the switching of the display destination is set to automatic switching, the display destination is the display unit 28 (display is ON) and the EVF 29 is set to non-display during the non-eye contact state (non-eye proximity state). During the eye contact state (eye proximity state), on the other hand, the display destination is EVF 29 (display is ON) and the display unit 28 is set to non-display. For the eyepiece detection unit 57, an infrared proximity sensor, for example, can be used, so as to detect the approach of an object to the eye piece 16 of the finder 17, which includes the EVF 29. When an object approaches, the infrared light emitted from a light-emitting unit (not illustrated) of the eyepiece detection unit 57 is reflected by the object, and is received by a light-receiving unit (not illustrated) of the infrared proximity sensor. By the amount of the received infrared light, the distance of the object to the eye piece 16 (eye piece distance) can be determined. In this way, the eyepiece detection unit 57 detects eye contact by detecting the proximity distance of the object to the eye piece 16. If an object that approaches the eye piece 16 within a predetermined distance is detected in the non-eye contact state (non-approaching state), it is determined that the eye has approached thereto. If an object of which approach was detected as distant by more than a predetermined distance in the eye contact state (approaching state), it is determined that the eye has withdrawn. The threshold to detect the eye contact and the threshold to detect eye withdrawal may be differentiated by hysteresis, for example. After eye contact is detected, it is assumed that the eye contact state continues until the eye withdrawal is detected. After eye withdrawal is detected, it is assumed that the non-eye contact state continues until eye contact is detected. The infrared proximity sensor is merely an example, and another type of sensor may be used for the eyepiece detection unit 57 as long as the sensor can detect the approach of an eye or an object that can be determined as eye contact.

The system control unit 50 can detect the following operation to the eye piece 16 or the state of the eye piece 16 by controlling the gazing determination unit 170 or the eyepiece detection unit 57.

line of sight which is not turning the eye piece 16 turn to the eye piece 16, that is, start of line of sight input line of sight is being inputted to the eye piece 16 gazing into the eye piece 16 line of sight being turned toward the eye piece 16 is withdrawn, that is, ending the line of sight input no gaze input to the eye piece 16

These operations, states and positions (directions) of the line of sight with respect to the eye piece 16 are notified to the system control unit 50 via the internal bus, and based on the notified information, the system control unit 50 determines the kind of operation (line of sight operation) that was performed on the eye piece 16.

The operation unit 70 is an input unit that receives operation instructions from the user (user operation), and is used to input various operation instructions to the system control unit 50. As illustrated in FIG. 2, the operation unit 70 includes the mode selection switch 60, the shutter button 61, the power switch 72 and the touch panel 70a. The operation unit 70 also includes other operation members 70b, such as the main electronic dial 71, the sub-electronic dial 73, the four-direction key 74, the SET button 75, the video button 76, the AE lock button 77, the enlargement button 78, the reproduction button 79 and the menu button 81.

The mode selection switch 60 switches the operation mode of the system control unit 50 to the still image capturing mode, the moving image capturing mode or the reproduction mode, for example. The modes included in the still image capturing mode are: the auto image capturing mode, auto scene determination mode, manual mode, aperture priority mode (Av mode), shutter speed priority mode (Tv mode), and program AE mode (P mode). Various scene modes and custom modes to perform image capturing settings for each image capturing scene are also included. Using the mode selection switch 60, the user can directly select any one of these modes. The user may also select an image capturing mode list screen using the mode selection switch 60 first, then select any one of the plurality of modes displayed on the list using another operation member. In the same manner, a plurality of modes may be included in the moving image capturing mode.

The shutter button 61 includes a first shutter switch 62 and a second shutter switch 64. The first shutter switch 62 is turned ON in mid-operation of the shutter button 61, that is, in the half-depressed state (image capturing preparation instruction), and generates a first shutter switch signal SW1. By the first shutter switch signal SW1, the system control unit 50 starts an image capturing preparation operation, such as the auto focus (AF) processing, the auto exposure (AE) processing, the auto white balance (AWB) processing and the pre-flash emission (EF) processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging unit 22 to writing the captured image to the recording medium 200 as an image file.

The touch panel 70a and the display unit 28 can be integrated. For example, the touch panel 70a is configured so that the transmittance of the light does not interfere with the display on the display unit 28, and is superimposed on the upper layer of the display plane of the display unit 28. Then the input coordinates on the touch panel 70a are corresponded with the display coordinates on the display plane of the display unit 28. Thereby a graphic user interface (GUI), allowing the user to directly operate the screen displayed on the display unit 28, can be provided. The system control unit 50 can detect the following operations on the touch panel 70a or the state thereof.

A finger or pen which is not touching the touch panel 70a touches the touch panel 70a, that is, touch is started (hereafter Touch-Down).

A finger or pen is touching the touch panel 70a (hereafter Touch-On).

A finger or pen is moving in them state of touching the touch panel 70a (hereafter Touch-Move).

A finger or pen, which is touching the touch panel 70a, is released from the touch panel 70a, that is, touch is ended (hereafter Touch-Up).

Nothing is touching the touch panel 70a (hereafter Touch-Off).

When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers or pen are detected.

These operations, states and coordinates of the positions of the fingers or pen touching the touch panel 70a are notified to the system control unit 50 via the internal bus. Then based on the notified information, the system control unit 50 determines the kind of operation (touch operation) that was performed on the touch panel 70a. For Touch-Move, the system control unit 50 can also determine the moving direction of the finger or pen moving on the touch panel 70a, based on the change of the positional coordinates, for the vertical components and the horizontal components on the touch panel 70a respectively. If Touch-Move is detected for at least a predetermined distance, the system control unit 50 determines that the slide operation was performed. An operation of quickly moving a finger on the touch panel 70a for a certain distance in the touched state and releasing the finger is called "flick". In other words, flick is an operation of moving and releasing the finger rapidly on the touch panel 70a. If Touch-Move is detected for at least a predetermined distance at a predetermined speed or faster, and Touch-Up is detected thereafter, the system control unit 50 then determines that flick was performed (determines that flick was performed after the slide operation). Further, a touch operation of touching a plurality of points (e.g. two points) simultaneously (multi-touch) and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 70a, various types of touch panels may be used, such as a resistive film type, a capacitive type, a surface acoustic wave type, an infrared type, an electromagnetic induction type, an image recognition type and an optical sensor type. There is a type of detecting a touch when the touch panel is actually contacted, and a type of detecting a touch when a finger or pen approaches the touch panel, but either type may be used.

Processing of Enlargement/Reduction

Figure 3:
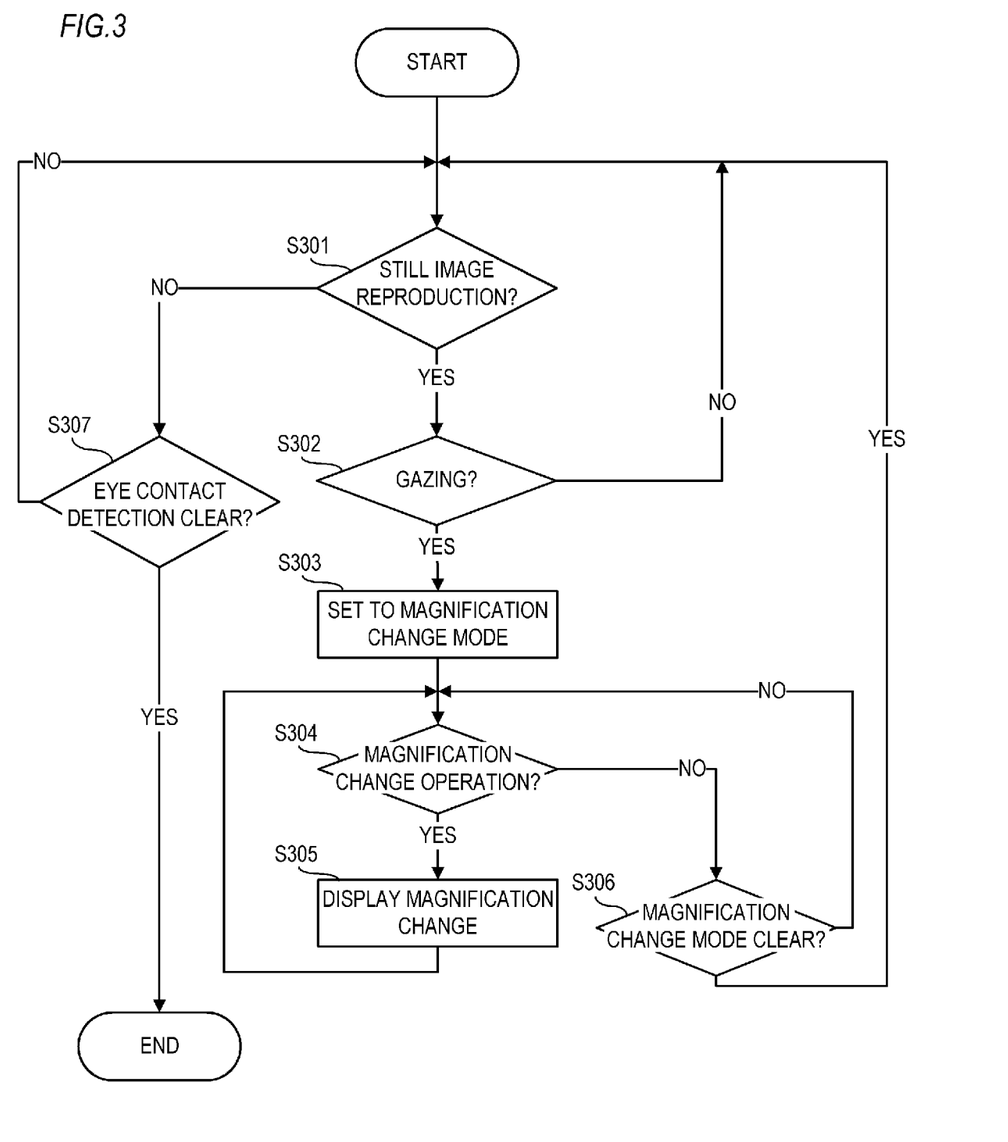
FIG. 3 is a flow chart depicting a magnification change processing according to the embodiment.

Processing of enlargement/reduction (zooming) of a still image (display object) according to this embodiment will be described with reference to the flow chart in FIG. 3. Each processing in the flow chart in FIG. 3 is implemented when the system control unit 50 develops the programs which are stored in the non-volatile memory 56 into the system memory 52, and executes the programs to control each functional block. When the digital camera 100 is started and the system control unit 50 controls the eyepiece detection unit 57 and detects that the eye 161 of the user contacted the eye piece 16, the processing of this flow chart starts.

Figure 4A:
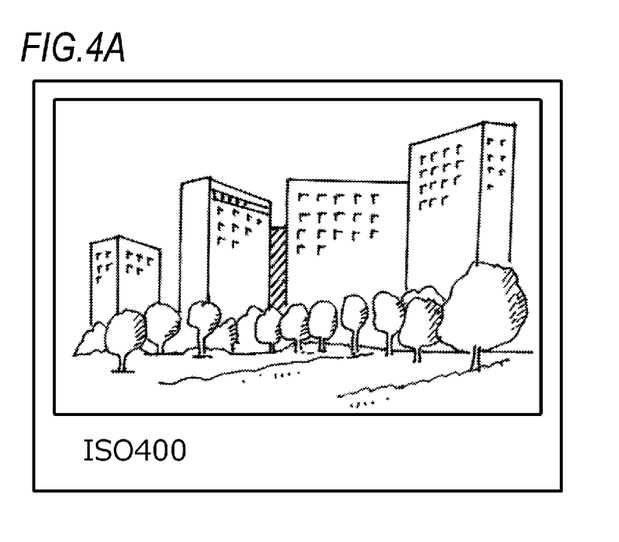
FIG. 4A to FIG. 4D are diagrams for describing the magnification change according to the embodiment.

In S301, the system control unit 50 determines whether the EVF 29 is reproducing a still image. If a still image is being reproduced, as illustrated in FIG. 4A, such information as image capturing conditions may also be displayed on EVF 29. Processing advances to S302 if a still image is being reproduced, or to S307 if not (e.g. a still image is not reproduced and LV or the menu screen is displayed). In this embodiment, the system control unit 50 determines whether the still image is being reproduced or not, but the display object is not limited to a still image, and the system control unit 50 may determine whether an arbitrary display object, such as a moving image, text, pattern and table, is being displayed (reproduced).

In S302, the system control unit 50 controls the gazing determination unit 170 (line-of-sight detection unit 160), and determines whether the still image reproduced on the EVF 29 is gazed at depending on whether the predetermined conditions corresponding to the gaze state are satisfied. Processing advances to S303 if gazing occurred, or to S301 if not.

As mentioned above, "gaze" refers to the state where the viewed position (position calculated as a position the user is viewing) is fixed for at least a predetermined period. For example, it is determined that gaze occurred if the viewed position did not deviate from a predetermined range centering around a certain position, until a predetermined period elapses from a certain timing. Or it is determined that gaze occurred when dispersion of the viewed position is a threshold or less, until a predetermined period elapsed from a certain timing.

In S302, processing advances to S303 when the system control unit 50 determined that gaze occurred, however, processing may advance to S303 in a case that is different from this. For example, in S302, the system control unit 50 controls the gazing determination unit 170 and determines whether the gazing period (period when gaze continues) exceeds a predetermined threshold or not. Then processing may advance to S303 if the gazing period exceeds the predetermined threshold, or to S301 if not. In concrete terms, even if the viewed position is fixed for 2 seconds and the system control unit 50 determines that gaze occurred, the processing does not advance to S303 unless the gaze continues for 5 seconds.

In S303, the system control unit 50 changes a non-magnification change mode, which is an operation mode other than a magnification change mode, to the magnification change mode, which is an operation mode in which the magnification of the still image (display magnification) can be changed (zoomed in/out) by such an operation as turning the sub-electronic dial 73. In other words, according to this embodiment, once the occurrence of gaze is determined, the state changes so that the magnification of the still image can be changed by such operation as turning the sub-electronic dial 73, even if the position of line of sight is changed (gaze is cleared) thereafter. In the magnification change mode, the operation to change the magnification of the still image is not limited to the operation of turning the sub-electronic dial 73. For example, in the magnification change mode, the magnification of the still image may be changed in accordance with such an operation as pressing a press button (e.g. four-direction key 74), touching the touch panel 70a, and line of sight input by the user of a predetermined icon displayed on the EVF 29.

Figure 4B:
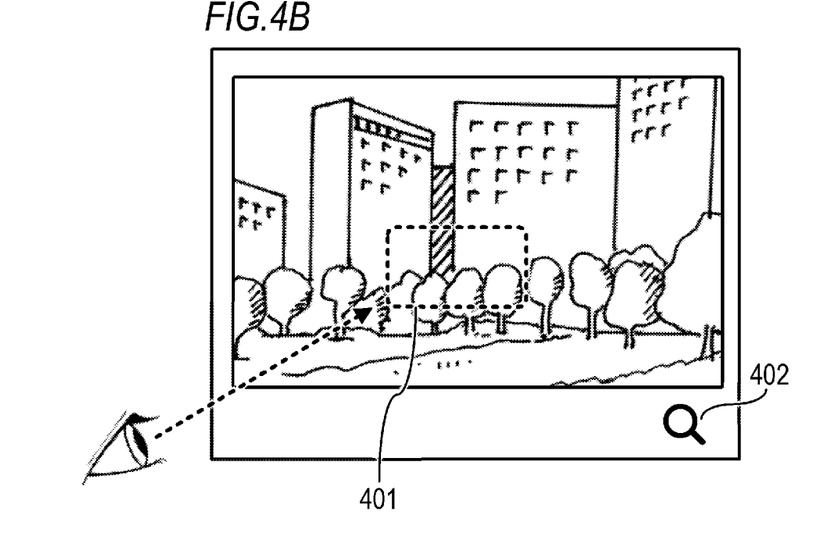

As illustrated in FIG. 4B, in S303, the system control unit 50 displays a line of sight frame, which is a frame to indicate a position (area) where line of sight is directed (gaze is occurring) in the still image, and displays an icon on EVF 29 indicating that the current mode is a magnification change mode, such as a magnification change mode mark. For example, an enlargement frame 401, indicated by a dotted line, is displayed (superimposed) at the viewed position in the still image, and a magnifying glass mark 402 is displayed as an icon to indicate that the current mode is a magnification change mode. The size of the line of sight frame may be a somewhat large area centering around the viewed position, but the display to indicate the viewed position is not limited to the line of sight frame, but may be a display indicating the center point of the viewed position, as long as the display can indicate the viewed position. The icon to indicate the magnification change mode is not limited to the magnifying glass mark 402, but may be an arbitrary mark, such as an arrow mark, or the icon itself may not be displayed.

In S304, the system control unit 50 determines whether an operation to change the magnification of the still image (display magnification) was performed on such an operation member as the sub-electronic dial 73. Processing advances to S305 if this operation was performed, or to S306 if not.

In the non-magnification change mode, which is an operation mode other than the magnification change mode, a function that is different from the function to change the magnification of the still image may be assigned to the sub-electronic dial 73. In a still image reproduction mode that is different from the magnification change mode (when reproducing a still image), a change function to change the image to the next image or to jump to the tenth image may be assigned to the sub-electronic dial 73. That is, the change function can be a function to switch the display object currently displayed on the EVF 29 to a different display object.

In S305, the system control unit 50 performs enlargement/reduction (zoom in/out) of the still image (display object) in accordance with the direction in which the operation member is operated, and the operation amount (number of times of operation). For example, if the sub-electronic dial 73 is turned to the right when viewing from the rear surface side of the digital camera 100, the system control unit 50 enlarges the still image with the gaze position (line of sight frame) as the center. If the sub-electronic dial 73 is turned to the left when viewing from the rear surface side of the digital camera 100, the system control unit 50 reduces the still image with the gaze position (line of sight frame) as the center. It is not always necessary to enlarge/reduce the image with the gaze position as the center, and the image may be enlarged/reduced with one of the four corners of the line of sight frame as the center.

Figure 4C:
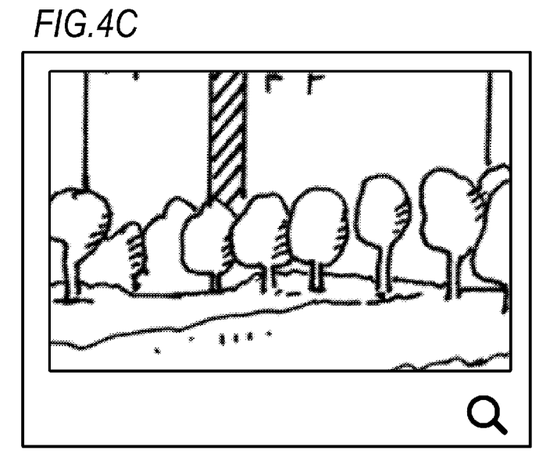

Here FIG. 4C illustrates a display example of a still image which was enlarged at a predetermined magnification. In FIG. 4C, it illustrates an image displayed when the still image in FIG. 4B was enlarged with the gaze frame (enlargement frame) 401 as the center. The still image is enlarged/reduced in accordance with the operation amount or a number of times of operation set to the operation member having the enlargement/reduction function. For example, the enlargement magnification is set in accordance with a number of times of clicking if the dial mechanically clicks when rotated, or the moving amount of the dial if the dial does not click, or a number of times of pressing if a press button is used, or a moving distance of a finger if a touch panel is used. Then based on this enlargement magnification, the still image is enlarged. The duration of the period of gaze at a predetermined icon displayed on the EVF 29 may be regarded as an operation amount, and the enlargement magnification may be determined thereby. For example, the system control unit 50 enlarges the still image one stage each time the dial is clicked when turning to the right (e.g. enlarged 1.2 times), and reduces the still image one stage each time the dial is clicked when turning to the left (e.g. reduced to ⅚). For example, the enlargement or reduction can be executed three stages or more at a time, and if the dial is turned a lot (many clicks) at a time, the still image is enlarged in multiple stages, as in ×2, ×5 and ×10. The user may be allowed to change the rate of the enlargement magnification in the state where the menu screen is displayed.

In S306, the system control unit 50 determines whether the magnification change mode was cleared. Processing advances to S301 if the magnification change mode is cleared, or to S304 if not. For example, the system control unit 50 clears the magnification change mode in the case where the duration of gazing at a predetermined icon (e.g. magnification change mode mark) exceeds a predetermined value, or where no operation is performed during a predetermined period. In other words, the system control unit 50 controls so that the enlargement/reduction (zoon in/out) of the still image is not executed by the operation on such an operation member as the sub-electronic dial 73.

In S307, the system control unit 50 controls the eyepiece detection unit 57, and determines whether the user's eye contact (eye proximity) is continuing (whether eye contact detection was not cleared). Processing advances to S301 if the eye contact is continuing, or all processing in this flow chart ends if not.

If gaze is detected in S302, the function of the sub-electronic dial 73 is changed to the magnification change function, but the function change is not limited to the case where gaze is detected. For example, the system control unit 50 may display a predetermined icon (e.g. a magnification change mode mark) in S303, and change the function to the magnification change function when the line of sight is detected on this icon. Further, the system control unit 50 may change the function to the magnification change function when a predetermined button (e.g. enlargement button 78) is pressed, or when touch is detected on the touch panel 70a. In the case where a condition to change the function of the sub-electronic dial 73 is not the occurrence of gazing, the system control unit 50 may change the magnification with the center of the still image as the center point, if the sub-electronic dial 73 is turned in the state where gazing is not detected, for example.

There are some possible methods to operate the line of sight frame after the line of sight frame is displayed in S303. A first method is a method of fixing the line of sight frame when processing advances to S303, and maintaining the same position until the magnification change mode is cleared. In the case of this method, once the position of the line of sight frame is fixed, the magnification can easily be changed with this position as the center, but if this position is incorrect, the position of the line of sight frame cannot be changed. A second method is a method of allowing the line of sight frame to follow the line of sight of the user once the line of sight frame is displayed. For the following method, a method of moving the frame at the timing of the occurrence of gazing, or a method of continuously following the line of sight of the user, regardless whether the gazing is occurring, for example, may be used. In particular, a method of following the line of sight of the user until the sub-electronic dial 73 is operated once, and then maintaining the same position of the sub-electronic dial 73 until the magnification change mode is cleared, or a method of always following the line of sight of the user regardless the operation on the sub-electronic dial 73 may be used. The above mentioned patterns may be used depending on the situation, or the user may select an appropriate pattern.

Figure 4D:
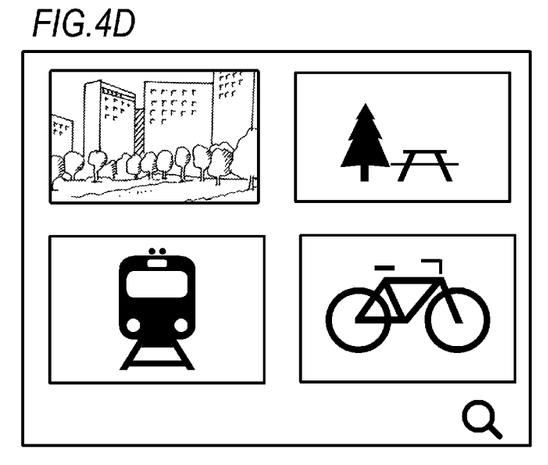

In the case where the still image is reduced from the original size (actual size, full scale) in S305, the system control unit 50 may display a list of a plurality of images, including this still image, on the EVF 29 as shown in FIG. 4D. Here the system control unit 50 may increase a number of images to be displayed in accordance with the turning amount (operation amount) of the sub-electronic dial 73, for example. The system control unit 50 may immediately return the still image back to the original size (actual size) when the gazing period of the user at a predetermined icon (e.g. magnification change mode mark) exceeds a predetermined period, and the sub-electronic dial 73 is turn to the reducing direction. Furthermore, the system control unit 50 may return the still image back to the original size when a predetermined button (e.g. enlargement button 78) is pressed, or when touch on the touch panel 70a is detected.

As described above, the digital camera according to Embodiment 1 enables enlargement/reduction of an image at a magnification desired by the user. Further, the enlargement/reduction can be performed in the state of maintaining eye contact (eye proximity) with the eye piece of the eye piece finder, hence the user can comfortably check an image.

In the above embodiment, an example of a still image that is reproduced and displayed was described as the target of enlargement/reduction, but the present invention is not limited to this. In the case where the mode is changed to the magnification change mode in the LV display mode (during LV display in the image capturing mode), the LV image may be enlarged/reduced at a display magnification selected from three stages of display magnification in accordance with the operation on the sub-electronic dial 73 (processing not by optical zooming but by electronic zooming). The switching from the non-magnification change mode to the magnification change mode is performed in the same manner as the processing described in S302 and S303. In this case, if the mode is the LV display mode and the non-magnification change mode, a function to change the image capturing setting (setting on exposure, setting on image quality), such as changing a set value of any one of shutter speed, aperture, exposure correction and ISO sensitivity, may be assigned to the sub-electronic dial 73. Thereby the user can quickly and intuitively enlarge a desired position of the LV image using the line of sight and the sub-electronic dial 73 while contacting their eye to the eye piece 16, and press the shutter button 61 directly in this state. In other words, the LV image can be closely and quickly checked and capture the image without missing the best photographic moments.

The electronic apparatus according to this embodiment is not limited to the digital camera 100. For example, the electronic apparatus may be a PC having a line-of-sight detection unit, that detects the viewed position with respect to a PC monitor. In the case of this type of PC configuration, when a wheel of the mouse is turned in the state of the user gazing at the display object displayed on the monitor, for example, the display object may be enlarged/reduced with the gazing point at the center in accordance with the rotation amount. The line-of-sight detection unit may be embedded in the PC, or may be connected to the PC externally (In this case, the PC performs processing similar to what was described above, based on the various commands notified by a line-of-sight detection device, which is an external apparatus). The target of enlargement/reduction is not limited to a captured image or a reproduced still image, but may be any display object that is displayed on the PC monitor. In other words, the present invention is applicable even if the display object for enlargement/reduction is a moving image, animation, a drawing, table, text, web site or the like.

The configuration of the line-of-sight detection unit 160 (line-of-sight detection unit) is not limited to the configuration in FIG. 2, but may be a configuration that does not include the infrared light-emitting diode 166, which is a light-emitting unit. In this case, the line-of-sight detection unit 160 detects the direction of the line of sight based on the positional relationship of the whites of the eye and the iris of the eye imaged by the line-of-sight detection sensor 164 (imaging sensor), or the positional relationship of the corneal reflection image generated by the reflection of the light which entered the pupil.

According to the present invention, in an electronic apparatus that enlarges/reduces a display object at a position in accordance with the line of sight of the user, the image can be enlarged/reduced at a magnification desired by the user.

Various controls described here assumed to be performed by the system control unit 50 may be performed by one hardware component, or the entire apparatus may be controlled by a plurality of hardware components (e.g. a plurality of processors or circuits) which share processing.

While the present invention has been described with reference to the preferred embodiments, the present invention is not limited to these specific embodiments, but includes various modes within the scope that does not depart from the essence of the invention. Each of the above mentioned embodiments is merely an example of the invention, each of embodiments may be combined as required.

Embodiments have been described using the case of applying the present invention to a digital camera as an example, but the present invention is not limited to this example, and can be applied to any electronic apparatus that can detect the line of sight of the user gazing at a display object displayed on the display. In other words, the present invention can be applied to a personal computer, a PDA, a portable telephone terminal, a portable image viewer, a printer that includes a display, a digital photo frame, a music player, a game machine and an electronic book reader.

Furthermore, the present invention can be applied not only to a standalone imaging apparatus, but also to a control apparatus that communicates with an imaging apparatus (including a network camera) wirelessly or via cable and remotely controls the imaging apparatus. Examples of the apparatus that remotely controls the imaging apparatus are: a smartphone, a tablet PC and a desktop PC. The imaging apparatus can be remotely controlled by notifying commands, to perform various operations and settings, from the control apparatus side to the imaging apparatus, based on the operation performed by the control apparatus or the processing performed by the control apparatus. A live view image captured by the imaging apparatus may be received wirelessly or via cable, and be displayed on the control apparatus side.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-104496, filed on Jun. 4, 2019, which is hereby incorporated by reference herein in its entirety.

What is claimed is:
1. An electronic apparatus comprising:
a specific operation member;
at least one memory and at least one processor which function as:
a line-of-sight detection unit configured to detect a line-of-sight a user with respect to a display; and
a control unit configured to:
determine whether or not gazing is performed by a user, wherein gazing is determined to have been performed if the position of the user's detected line-of-sight is fixed on a region of the display for longer than a predetermined threshold; and
in response to an operation on the specific operation member, perform a function according to the determination of whether or not the gazing is performed, wherein the control unit is further configured to:
(i) while it is determined that the gazing corresponding to the line-of-sight detected by the line-of-sight detection unit is performed, in response to the operation on the specific operation member, enlarge or reduce an image displayed on the display,
wherein the image is enlarged or reduced with the position of the user's detected line-of-sight as the center of the image, and
wherein the image is enlarged or reduced by a display magnification selected from at least three stages of display magnification, wherein the display magnification is selected in accor- dance with an operation amount or a number of times of the operation on the specific operation member, and
(ii) while it is determined that the gazing corresponding to the line-of-sight detected by the line-of-sight detection unit is not performed, in response to the operation on the specific operation member, a function different from both enlargement and reduction is performed.

2. The electronic apparatus according to claim 1, wherein the specific operation member is a dial, and
the operation on the specific operation member is rotating the dial.

3. The electronic apparatus according to claim 1, wherein the specific operation member is a press button, and
the operation on the specific operation member is pressing the press button.

4. The electronic apparatus according to claim 1, wherein the specific operation member is a touch panel, and
the operation on the specific operation member is touching the touch panel.

5. The electronic apparatus according to claim 1,
wherein the control unit determines whether or not the gazing is performed according to whether the line-of-sight detected by the line-of-sight detection unit satisfies a predetermined condition or not,
wherein the predetermined condition is that a period of gazing exceeds a predetermined threshold.

6. The electronic apparatus according to claim 1, wherein in a case where it is determined that the gazing is performed, the control unit controls so that an indication to indicate the gazing position is displayed on the display.

7. The electronic apparatus according to claim 1, wherein in a case where it is determined that the gazing is performed, the control unit controls so that an icon to indicate that enlargement or reduction is possible by the operation on the specific operation member, is displayed on the display.

8. The electronic apparatus according to claim 7, wherein the control unit is further configured to change the display magnification to the actual size in the case where a period of gazing at the icon exceeds a second threshold and the specific operation member is operated.

9. The electronic apparatus according to claim 7, wherein the control unit is further configured to control so that enlargement or reduction by operating the specific operation member is not executed in the case where a period of gazing at the icon exceeds a third threshold.

10. The electronic apparatus according to claim 1, wherein in the case where it is determined that the gazing is not performed, the control unit controls so that a display object displayed on the display is switched with another display object, in response to the operation on the specific operation member.

11. The electronic apparatus according to claim 1, wherein
the control unit is further configured to control so that 1) in the case where it is determined that the gazing is not performed, a change of an image capturing setting on image capturing by an imaging unit is executed in response to the operation on the specific operation member, and 2) while it is determined that the gazing is performed, a display magnification of a gazed region of a live image is enlarged or reduced with a position based on the gazing position detected by the line-of-sight detection unit as the center, in response to the operation on the specific operation member,
the live image was captured by the imaging unit and is displayed on the display.

12. The electronic apparatus according to claim 11, wherein the image capturing setting on the image capturing is a setting of at least one of: shutter speed, aperture, exposure correction and ISO sensitivity.

13. The electronic apparatus according to claim 11, wherein
the display can be viewed via an eye piece of an eye piece finder, and
the specific operation member is disposed at a position that can be operated by a finger of a hand holding the electronic apparatus in state where the user is contacting their eye to the eye piece finder.

14. A method of controlling an electronic apparatus including a specific operation member, comprising:
a line-of-sight detection step of detecting a line-of-sight of a user with respect to a display; and
a control step of controlling the apparatus to:
determine whether or not gazing is performed by a user, wherein gazing is determined to have been performed if the position of the user's detected line-of-sight is fixed on a region of the display for longer than a predetermined threshold; and
in response to an operation on the specific operation member, perform a function according to the determination of whether or not the gazing is performed,
wherein the control step further controls the apparatus to:
(i) while it is determined that the gazing corresponding to the line-of-sight detected in the line-of-sight detection step is performed, in response to the operation on the specific operation member, enlarge or reduce an image displayed on the display,
wherein the image is enlarged or reduced with the position of the user's detected line-of-sight as the center of the image, and
wherein the image is enlarged or reduced by a display magnification selected from at least three stages of display magnification, wherein the display magnification is selected in accordance with an operation amount or a number of times of the operation on the specific operation member, and
(ii) while it is determined that the gazing corresponding to the line-of-sight detected in the line-of-sight detection step is not performed, in response to the operation on the specific operation member, a function different from both enlargement and reduction is performed.

15. A non-transitory computer readable medium that stores a program, wherein
the program causes a computer to execute a method of controlling an electronic apparatus that includes a specific operation member, the method of controlling the electronic apparatus including:
a line-of-sight detection step of detecting a line-of-sight of a user with respect to a display; and
a control step of controlling the apparatus to:
determine whether or not gazing is performed by a user, wherein gazing is determined to have been performed if the position of the user's detected line-of-sight is fixed on a region of the display for longer than a predetermined threshold; and
in response to an operation on the specific operation member, perform a function according to the determination of whether or not the gazing is performed, wherein the control step further controls the apparatus to:
(i) while it is determined that the gazing corresponding to the line-of-sight detected in the line-of-sight detection step is performed, in response to the operation on the specific operation member, enlarge or reduce an image displayed on the display,
   wherein the image is enlarged or reduced with the position of the user's detected line-of-sight as the center of the image, and
   wherein the image is enlarged or reduced by a display magnification selected from at least three stages of display magnification, wherein the display magnification is selected in accordance with an operation amount or a number of times of the operation on the specific operation member, and
(ii) while it is determined that the gazing corresponding to the line-of-sight detected in the line-of-sight detection step is not performed, in response to the operation on the specific operation member, a function different from both enlargement and reduction is performed.

* * * * *